United States Patent
Kupchik et al.

[11] Patent Number: 6,023,472
[45] Date of Patent: Feb. 8, 2000

[54] HIGH SPEED FD/HD DATA TRANSLATOR AND NETWORK

[75] Inventors: Aleksandr L. Kupchik, Nashua, N.H.; Sorhaug Asbjorn, Gronton; Yeh-Tsong Wen, Andover, both of Mass.

[73] Assignee: Lancast, Inc., Nashua, N.H.

[21] Appl. No.: 08/676,796

[22] Filed: Jul. 8, 1996

[51] Int. Cl.[7] ............................................. H04J 3/02
[52] U.S. Cl. ........................................ 370/446; 370/293
[58] Field of Search ................................ 370/446, 276, 370/279, 280, 281, 282, 293, 294, 295, 296, 278, 256, 257, 445, 451, 461, 462, 465

[56] References Cited

U.S. PATENT DOCUMENTS

| | | | |
|---|---|---|---|
| 4,771,417 | 9/1988 | Maxwell et al. | 370/296 |
| 4,897,831 | 1/1990 | Negi et al. | 370/296 |
| 5,406,554 | 4/1995 | Parry | 370/58.1 |
| 5,459,723 | 10/1995 | Thor | 370/60 |
| 5,561,666 | 10/1996 | Christensen et al. | 370/296 |
| 5,661,718 | 8/1997 | Bremer et al. | 370/286 |

*Primary Examiner*—Dang Ton
*Attorney, Agent, or Firm*—Stephen G. Matzuk

[57] ABSTRACT

A high speed data network having a novel data translator having an SRAM data buffer in the full to half duplex direction and flow control media access elements, such as for detecting data collision and retransmission of data, for providing transparent high data rate transfer between full and half duplex data media. The main SRAM data buffer provides multiple frame FIFO storage and configured to provide alternating incoming and outgoing data access. The preferred embodiment further includes main SRAM incoming FIFO and outgoing FIFO memories. The outgoing FIFO memory is configured to operate in an alternating in/out memory access (independent of the main SRAM incoming and outgoing data access) providing data byte access after the byte is written from the main SRAM. Furthermore, the outgoing FIFO memory supplies the data to be retransmitted in the event of a data collision, without interrupting the operation(s) of the main SRAM buffer. Various network configurations according to the present invention provide high speed CSMA/CD data exchange according to existing and future data and medium formats over a greatly extended distance.

17 Claims, 4 Drawing Sheets

HIGH SPEED FD/HD DATA TRANSLATOR AND NETWORK

FIELD OF THE INVENTION

The present invention relates to high speed data networks and network interface devices, in particular, to high speed network data translators providing bi-directional full duplex/half duplex data translation and networks implemented therewith.

BACKGROUND OF THE INVENTION

Initially, coax-based networks were limited to half duplex even as the coax medium was upgraded. By arranging the network in a star configuration (to a repeater hub), full duplex links could be supported, but required the physical reconfiguration and still had performance limitations. Although lower data rate star hub repeaters could be linked over short to moderate distances, e.g. 1 mile for 10 BaseT, multiple linked repeaters for higher data rates, e.g. 100BaseT, had a much more limited spacing.

Alternately as shown in the prior art configuration 20 of FIG. 1, a repeater 25 was connected to full duplex media by dedicating an entire switch 22 to each data terminal equipment (DTE). However, such network implementations are costly and ultimately inefficient, requiring the switch 22 and the repeater to be close (within half the collision diameter, or 100 meters for a 100 Mbps CSMA/CD).

SUMMARY OF THE INVENTION

The translator and network according to the present invention effectively extends the minimum distance between interconnected CSMA/CD (DTE) devices providing networks configurations previously unavailable for a particular data rate by transparently extending a half duplex medium with a higher data rate, full duplex medium.

The extension is provided by a novel modular full/half duplex high speed data translator interface including a random access memory (SRAM) as a main multi-frame data buffer for the full-to-half duplex static direction. The translator interface also includes corresponding media access control circuitry to provide data from the main multi-frame data buffer to the half duplex medium, to detect data packet collisions on the medium, and to retransmit the data onto the half duplex medium in the event of data collisions.

The preferred embodiment provides further enhancements by including incoming FIFO and outgoing FIFO buffers connected to the main frame buffer to provide efficient data transfer from the full duplex medium through the incoming FIFO, into the main frame data SRAM, into the outgoing FIFO and onto the half duplex medium.

The main frame SRAM is configured to be alternately addressable from the half duplex and the full duplex side, providing rapid frame data access without incurring an arbitrator time penalty. Moreover, the outgoing FIFO memory comprises a memory alternately addressable to provide two access times for data to be written into or read from the memory, wherein such incoming and outgoing two access times are determined independently from the alternate memory access of the main frame SRAM.

Moreover according to the present invention, the media access circuitry can temporarily hold the Ethernet data packet and effect a re-transmission of data onto the half duplex from the outgoing FIFO memory without interrupting the operations of the main frame SRAM, further enhancing the performance of the apparatus according to the present invention.

Typically, an embodiment of the present invention provides substantially transparent translation between full duplex 100BaseFX and half duplex 100BaseTX, connects a data switch to a 100BaseT repeater with 2 km fiber optic cable, and/or converts a 100BaseT repeater into a collapsed backbone hub. Moreover, typical embodiments of the present invention effectively increase the repeater collision domain from 100 m to 2 km with fiber optic cable.

BRIEF DESCRIPTION OF THE DRAWING

These and further features of the present invention will be better understood by reading the following Detailed Description together with the Drawing, wherein.

DETAILED DESCRIPTION OF THE INVENTION

Figure 1:
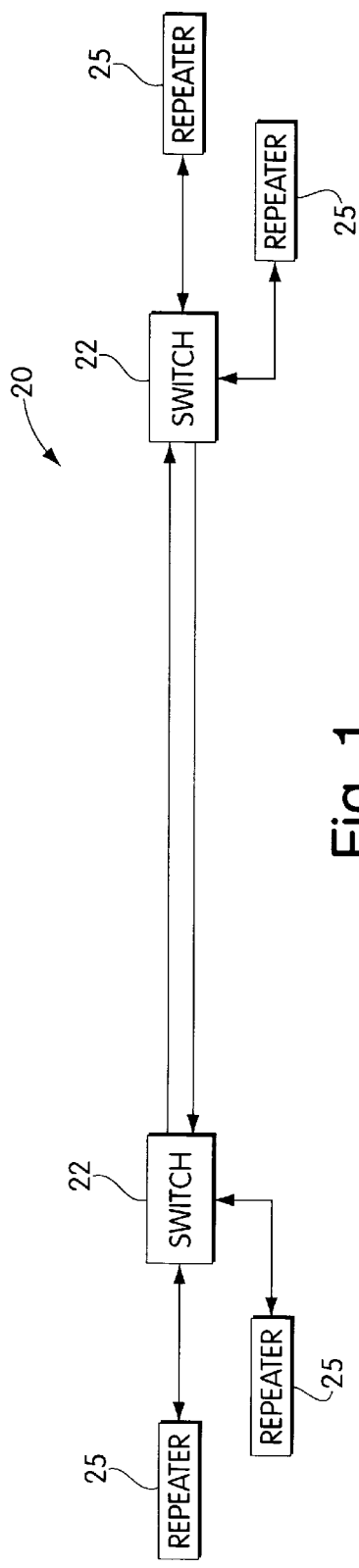
FIG. 1 is a block diagram of a typical prior art network.
Figure 2:
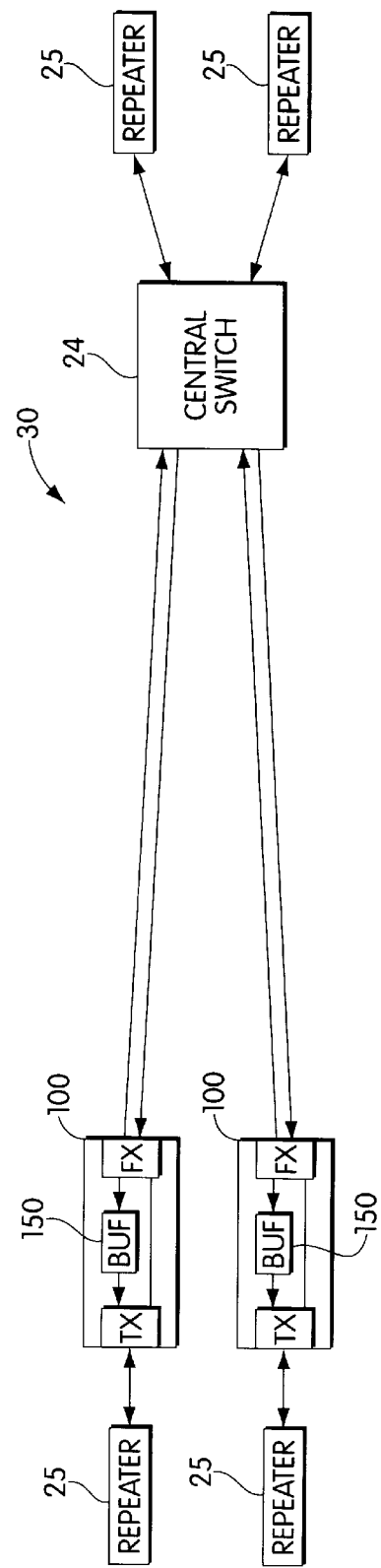
FIG. 2 is a block diagram of one embodiment of the network and FD/HD translator according to the present invention.

A typical system embodiment 30 according to the present invention is shown in FIG. 2, wherein remote repeaters 25 (or other DTE) connect to the centralized switch 24 through the FD/HD data translator 100 according to the present invention. The FD/HD data translator 100 according to one embodiment includes a large (e.g. 1 Mbit) internal buffer memory 150 which receives data from the full duplex fast Ethernet (FX) port according to IEEE 802.3u specifications, and transmits that data to the half duplex twisted pair (TX) port, as described in more detail, below.

Figure 3A:
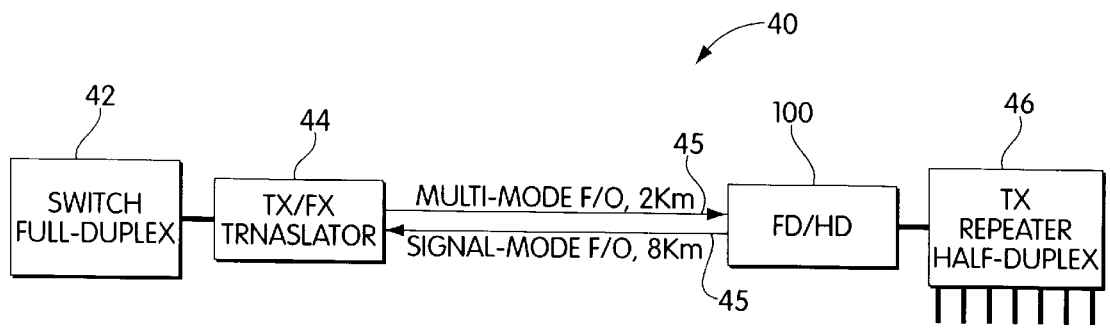
FIG. 3A is a block diagram a second network embodiment according to the present invention.

Further exemplary data network embodiments and configurations are shown in FIGS. 3A–3D. In FIG. 3A, a full duplex switch 42 is connected to a half duplex TX repeater 46 is a TX/FX translator (having no buffer), a fiber optic medium 45, and a FD/HD translator 100. The exemplary TX/FX translator and TX repeater comprise model nos. 6318 and 6490 of Casat Technology, Inc. of Nashua, N.H., the descriptions and documentation thereof being incorporated by reference.

Figure 3B:
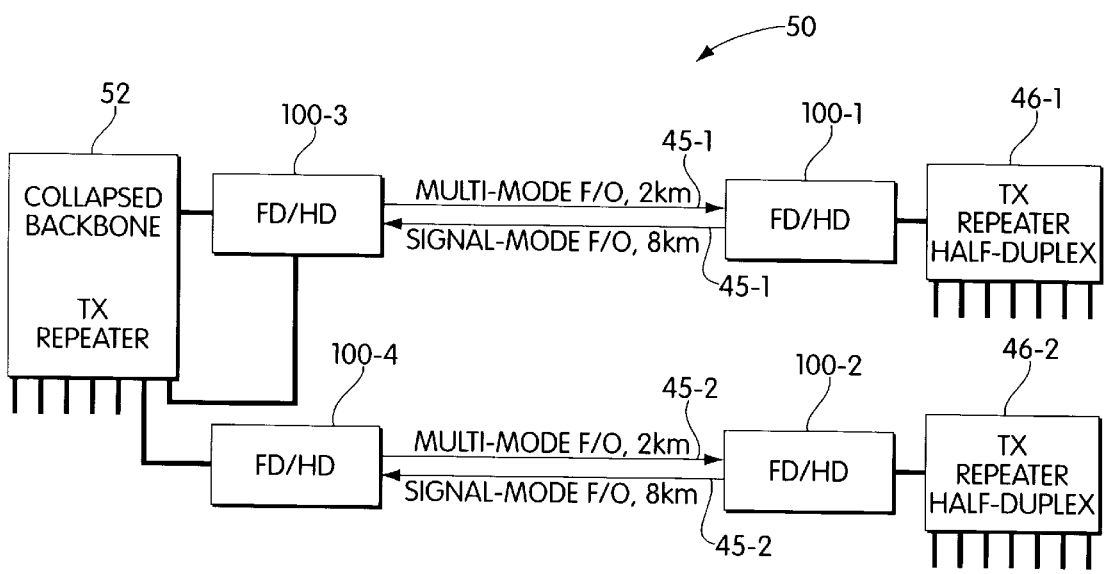
FIG. 3B is a block diagram a third network embodiment according to the present invention.

FIG. 3B shows two half duplex TX repeaters, 46-1 and 46-2, connected to a single collapsed backbone TX repeater 52 through respective FD/HD translators 100-1 and 100-2, corresponding fiber optic media 45-1 and 45-2, and FD/HD translators 100-3 and 100-4. The exemplary collapsed backbone repeater comprises model no. 6490 of Casat Technology, Inc. of Nashua, N.H.

Figure 3C:
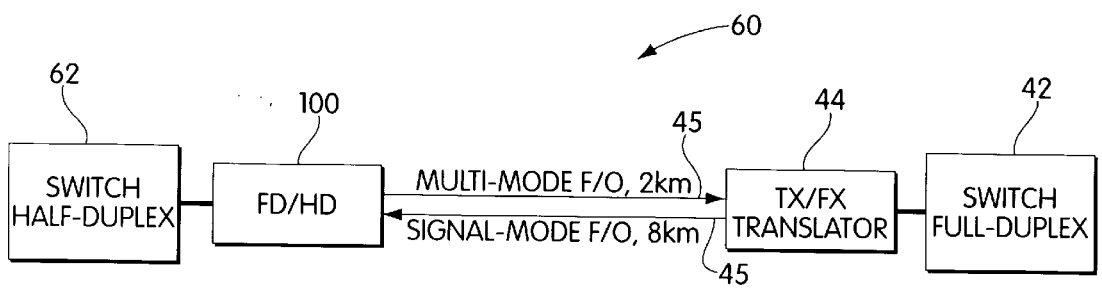
FIG. 3C is a block diagram a fourth network embodiment according to the present invention.

FIG. 3C shows a half duplex switch 62 is connected to a full duplex switch 42 through a FD/HD translator 100, an optical fiber medium 45, and a TX/FX translator 44.

Figure 3D:
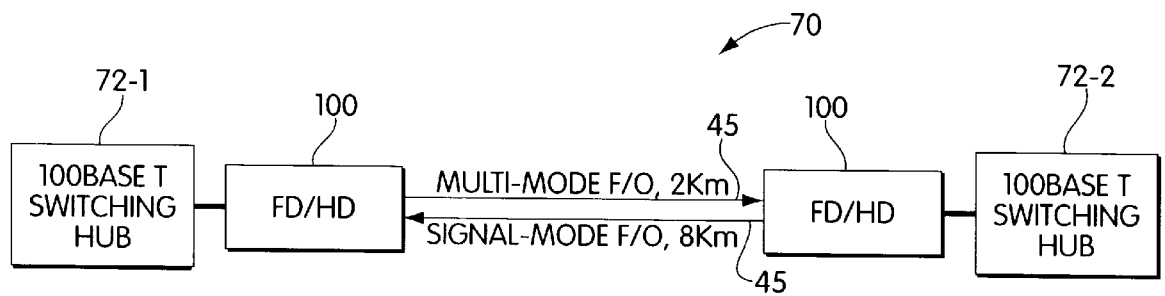
FIG. 3D is a block diagram a fourth network embodiment according to the present invention.

FIG. 3D shows a 100BaseT switching Hub 72-1 connected to another 100BaseT switching hub 72-2 via a FD/HD translator 100-1, optical medium 45, and a second FD/HD translator 100-2. Configurations possible according to the present invention are not limited to the above, and may include other configurations.

Figure 3E:
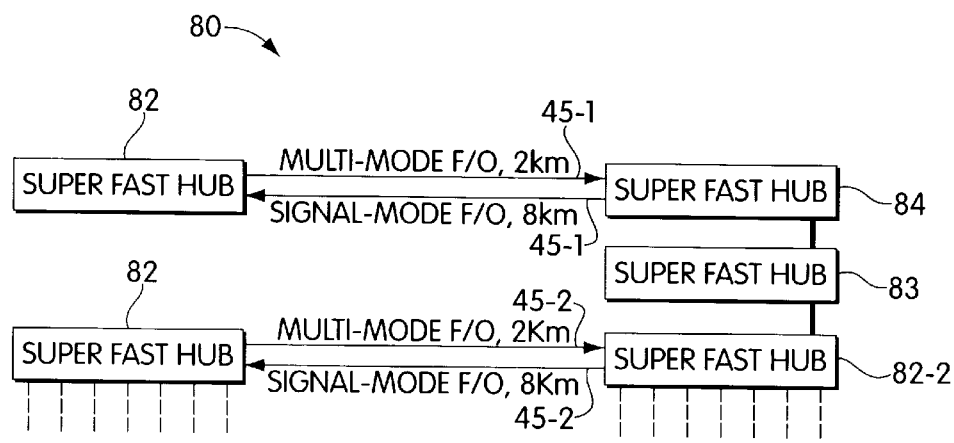
FIG. 3E is a block diagram a fifth network embodiment according to the present invention.

A further alternate network configuration according to the present invention is shown in FIG. 3E, wherein a multi-port 802.3u hubs, such as super fast hubs 82-1 and 82-2 which operate with a 100BaseTX format, are connected together with a fiber optical medium 45-2. Communication is provided by FD/HD data translators according to the present invention incorporated within the hubs 82, wherein the fiber optic medium connects to the full duplex side and the TX connections are received by the half duplex side. Additional expansion hubs 83 and 84 are connected to hub 82-2, and may be themselves connected to distant hubs as hub 82 is connected to hub 82-33 via fiber optical medium 45-1. In the embodiment shown, hubs 82, 83 and 84 comprise super fast hubs model nos. 6432, 6421 and 6431, respectively, manufactured by Casat Technology, Inc., the structural and functional documentation thereof being incorporated by reference.

Figure 3F:
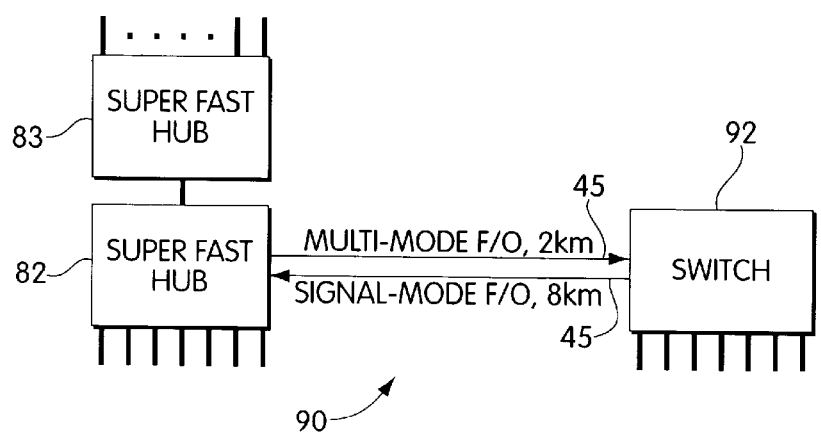
FIG. 3F is a block diagram a sixth network embodiment according to the present invention.

A half duplex or a full duplex switch 92 is connected to a super fast hub 82 with an optical fiber medium in a network embodiment 90 shown in FIG. 3F. As shown above, the number of ports connected to the hub end may be expanded with a "stackable" hub 83 connected to hub 82.

Figure 4:
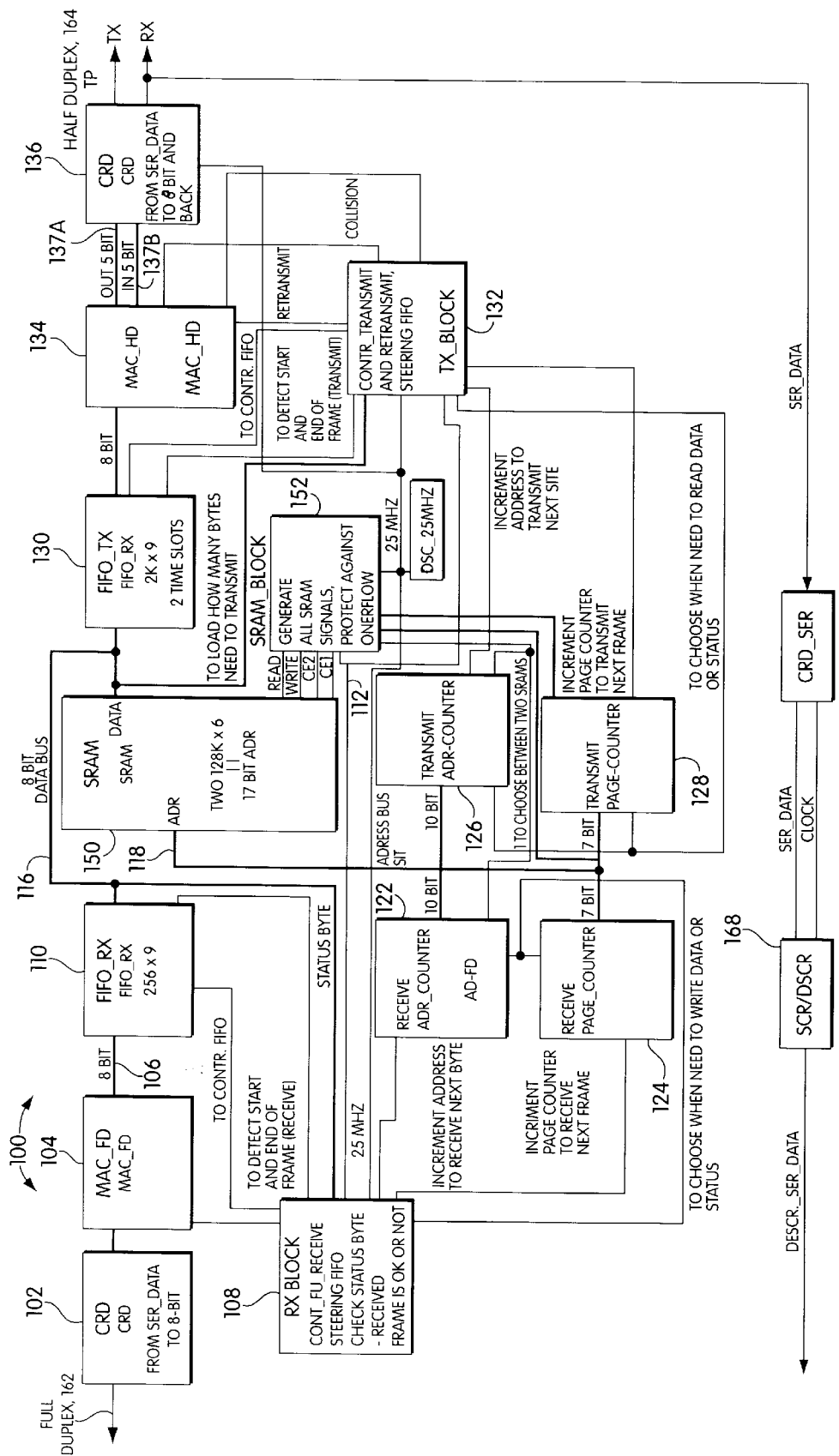
FIG. 4 is a more detailed block diagram of one embodiment of the FD/HD data translator according to the present invention.

A block diagram of the FD/HD repeater 100 according to one embodiment of the present invention is shown in FIG. 4. When data is coming from the full duplex (FD) side 162, it is converted from serial into parallel format at a clock recovery device for the full duplex side, CRD_FD 102. A clock recovery device recovers the clock signal from the received signal and converts the data (e.g. from serial to parallel) format. The CRD_FD 102 sends data in parallel format to the media access controller (MAC) for the full duplex side, MAC_FD 104. The media access controller supports the selected media format (e.g. IEEE 802.3 specifications for Ethernet LAN's as in the present embodiment). The MAC_FD 104 supports full duplex (FD) the medium. In full duplex, the MAC is able to transmit and receive at the same time and ignores collisions. When MAC_FD 104 detects beginning of a data frame, it passes one byte at a time to the external data bus 106. Also, MAC_FD 104 will alert the RX_BLOCK 108 that new frame is arriving.

The RX_BLOCK 108 generates all the signals necessary to perform the management of the FIFO_RX 110, and provides the signals to increment the receive address and receive page counters, 122, 144, respectively. Initially, the RX_BLOCK 108 checks the main buffer SRAM 150 memory to detect if an empty page of memory (2 K bytes) is available. If the SRAM 150 memory has an empty page of memory available, the RX_BLOCK 108 then enables and controls the FIFO_RX 110 to load data.

The FIFO_RX is a first-in-first-out (FIFO) memory to temporarily store data from the full duplex side. In the present embodiment, available static 9 bit by 256 word FIFO memory is used. The FIFO_RX facilitates the operation of two processes: receive from the full duplex side, write in SRAM 150 memory. When the FIFO_RX 110, is filled (over a defined threshold), the FIFO_RX 110 generates a request (to RX_BLOCK 108) to load the SRAM 150 memory. From this point, the RX_BLOCK 108 together with SRAM_BLOCK 152 begins to transmit data from the FIFO_RX 110 to the SRAM 150 starting from address 0.

The RX_BLOCK 108 increases the AD_FD receive address counter 112 to prepare a new address sent over the address bus 118 to the SRAM 150 for next byte, when the SRAM_BLOCK 152 has performed the current SRAM access. Following the last byte of the data frame, three bytes of management information are appended. The first byte carries status information. The last two defines length of the frame. The RX_BLOCK 108 loads these bytes on the top of the page.

The main buffer static random access memory, SRAM 150, comprises in the present embodiment a 256K×8 (256K byte) memory. As an Ethernet frame has a minimum length of 64K bytes and a maximum length of 1518 bytes, the SRAM 150 in the present embodiment can store 128 frames with the memory divided on pages, wherein each page has 2K bytes.

According to the present invention, the main SRAM buffer 150 access is shared between full duplex (FD) side and half duplex (HD) side without additional delay as the SRAM_BLOCK 152 generates two time slots. The first time-slot is for the full duplex side (FD time slot). The second one is for HD side (HD time slot). If the FIFO_RX 110 is not empty the FIFO_RX 110 takes the full duplex time slot and perform SRAM 150 access and data transfer. If the FIFO_RX 110 is empty the RX_BLOCK 108 will not use the time slot. Thus the RX_BLOCK need not be granted permission to perform SRAM access every time FIFO_RX has data to be stored in the SRAM 150, eliminating time to request and wait for SRAM 150 access.

When the entire data frame loaded into the SRAM 150, the RX_BLOCK 108 then checks status byte for errors (by error detecting techniques known in the art, e.g. 'store and forward'). If the data frame was received with errors, frame is discarded. If data frame is OK, the RX_BLOCK 108 increases the page counter 124 and generates a request to the HD side. A new page now is defined by the receive page counter 124 and sent to the SRAM 150 over the address bus 118, and the RX_BLOCK 108 resets the receive address counter AD_FX 108 to 0.

After receiving request from the RX_BLOCK 108, the TX_BLOCK 132 starts to bring data from SRAM 150 to the 130 FIFO_TX. The FIFO_TX stores the frame to be transmitted to the HD side. Similar to the full duplex side, the TX_BLOCK 132 will use an HD time slot to perform SRAM 150 access. It uses the time slot only if the page contains a complete frame having the necessary header status and length information. A transmission process begins when the TX_BLOCK 132 takes length bytes of the frame and loads the transmit length counter in the TX_BLOCK 132. When the all frame located in the FIFO_TX, the length counter stops the transmit process. The transmit ADR counter 126 provides the SRAM address by the address bus 118 for every byte stored in the SRAM 150 which has to then be transmitted to FIFO_TX 130.

Similar to, but independent from the operation of the SRAM 150, the FIFO_TX 130 has separate access time "slots" for data incoming from the SRAM 150 and data outgoing to the MAC_TX 134. which permit independent and substantially simultaneous in and out transfers of data. The FIFO time slots are provided according to the respective BLOCK operations. The FIFO_RX 110 has two data ports, each with a separate clock synchronized according to the incoming data MAC 104 and to the main SRAM 150, respectively.

When data reaches a defined threshold, the FIFO_TX 130 asserts signal to the TX_BLOCK 132. At this time, the TX_BLOCK 132 is ready to enable and control the MAC_HD 134 to receive the data frame from the FIFO_TX and transmit the frame on the media via the clock recovery device CRD 136. It is important to note that TX_BLOCK 132 does not wait until the entire frame from the SRAM 150 is transmitted to the FIFO_TX to begin data transfer from the FIFO_TX 130. This approach reduces latency.

The MAC_HD 134 waits for a period on the HD medium when no other station is transmitting, and then sends the data frame message. If the data frame collides with a signal from another station, the MAC_HD 134 detects the collision and sends a 'jam' signal to the medium 164. After a random amount of time (back-off), the MAC_HD 134 again attempts to (re)transmit; after 16 attempts, the frame is discarded. In the present embodiment, the MAC_HD 134 will declare a collision when data is sent (via 137A) and received (137B) at the same time.

A half duplex transmit process begins when the MAC_HD 134 detects that no another stations is transmitting on the half duplex media 164. If the media is free, the MAC_HD 134 asserts signal to the TX_BLOCK 132. After receiving signals which indicate that MAC_HD 134 is ready to transmit frame, the TX_BLOCK 132 will take data from FIFO_TX 130 and send to the MAC_HD The MAC_HD then sends the frame in bit- serial form. If a MAC_HD-transmitted frame collides with that of another station, the MAC_HD 134 will send jam signal to the TX_BLOCK. The MAC_HD 134 then tries to retransmit the data frame. It sends special signal to the TX_BLOCK 132 to start retransmit which again presents the data to be transmitted from the FIFO_TX. The TX_BLOCK 132 will reset FIFO_TX 130 address pointer to 0, and then supply frame to the MAC_HD 134 beginning with first byte of the data frame. This process does not affect process that performs filling FIFO_TX from the SRAM 150, as the FIFO has two separate time slots for reading and writing data. Thus, it means that the two (read and write) processes can go at the same time: loading FIFO_TX 130 and transmit (or retransmit) frame through the MAC_HD 134; moreover, latency is also reduced. The transmit logic as described above allows a frame of data to be retransmitted a maximum of 15 times (16 transmission attempts) due to collision. If a data frame has been transmitted successfully, the transmit page counter 128 is incremented. If not, the frame is discarded. To start fetching the next data frame from SRAM 150, TX_BLOCK 132 will reset the transmit ADR counter 126 to 0. Then the TX_BLOCK 132 will transmit new frame from page defined now by the page counter 128. When the data frame is transmitted from some page in the SRAM 150 to the FIFO_TX 130, the same page can be used by the full duplex side at the same time to further facilitate data transfer. The TX_BLOCK 132 sends signal to the RX_BLOCK 108 that a new page of SRAM 150 space is available. It is possible to maximize the efficiency of the SRAM 150 buffer because the FIFO_TX 130 can store the entire maximum length of the frame, and frame can be transmitted (or retransmitted) directly from the FIFO_TX without needing to be re-read from the SRAM 150.

The SRAM_BLOCK 152 does not allow the full duplex side to send a frame to the SRAM 150 if no free page is available. Also, the SRAM_BLOCK 152 protects the half duplex side from a second transmission of the same data frame from the SRAM 150.

In the reverse direction, data from the HD side 164 is received by the serial clock recovery device CRD_SER 166 which recovers the clock. Subsequently, the unconverted serial data is directly converted to the appropriate full duplex 162 standards (e.g. 100 Megabit FX standard) by a scrambler/descrambler SCR_DSCR 168 (or equivalent) according to the clock recovered by the CRD_SER 166. Thus according to the present invention, data is transferred in this direction without incurring any data format conversion latency time penalties.

The FD/HD data translator and networks according to the present invention may be extended to provide still higher data rate communications of 1000 MBit (1 Giga bit) and beyond according to future embodiments according to the present invention as may be implemented by one of ordinary skill in the art. Further modifications and substitutions of the above described invention as made by one of ordinary skill are included within the scope of the present invention, which is not limited except by the claims which follow.

What is claimed is:

1. Apparatus for providing a high data rate transfer between a half duplex medium and a full duplex medium, comprising:

means for receiving data from said full duplex medium and providing a corresponding buffer input signal;

a data buffer for selectively receiving said buffer input signal and for selectively providing a buffer output signal corresponding to previously stored buffer input signals;

means for detecting a data collision on said half duplex medium and providing a detected collision output signal upon detection of said data collision;

means for transmitting data received from said buffer output signal to said half duplex medium, including
      means for retransmitting said received data to said half duplex medium according to said detected collision output signal; and means for providing data received from said half duplex medium to said full duplex medium.

2. The apparatus of claim 1, wherein
   said means for receiving said data from said full duplex medium includes a dual access FIFO for selectively storing data corresponding to said data received from said full duplex medium, and for selectively providing to said data buffer from said means for receiving dual access FIFO data corresponding to received data.

3. The apparatus of claim 2, wherein
   said dual access FIFO comprises a receive FIFO and means for providing a first receive FIFO clock signal corresponding to data received from said full duplex medium and a second receive FIFO clock signal corresponding to data provided to said data buffer.

4. The apparatus of claim 1, wherein
   said means for transmitting data corresponding to data from said full duplex medium includes a dual access FIFO for selectively storing data from said data buffer corresponding to said data received from said full duplex medium, and for selectively providing stored data therefrom to said half duplex medium.

5. The apparatus of claim 4, wherein
   said dual access FIFO comprises a transmit FIFO and means for providing a first transmit FIFO clock signal corresponding to data received from said data buffer and a second transmit FIFO clock signal corresponding to data provided to said full duplex medium.

6. The apparatus of claim 1, wherein
   said data buffer comprises
      a random access memory for storing data according to address and control signals;

means for selectively providing a first address signal corresponding to data received from said means for receiving; and means for selectively providing a second address signal corresponding to data provided to said means for transmitting.

7. The apparatus of claim 6, wherein said means for selectively providing said first and said second address comprises means for alternately providing said first and said second address signals.

8. A high speed data network comprising:

a high speed full duplex medium; and a plurality of data Full Duplex/Half Duplex translators each connected to respective half duplex data equipment and to said high speed duplex medium, wherein each said Full Duplex/Half Duplex data translator comprises buffer means for storing frame data corresponding to data from said full duplex medium to half duplex medium, and means for substantially directly conveying frame data corresponding to said half duplex medium data to said full duplex medium.

9. The high speed data network of claim 8, further comprising at least one full duplex switch connected to a corresponding said Full Duplex/Half Duplex data translator.

10. The high speed data network of claim 8, further comprising at least one half duplex translator connected to a corresponding said Full Duplex/Half Duplex data translator.

11. The high speed data network of claim 8, further comprising at least one of a collapsed backbone repeater and a hub connected to a corresponding said Full Duplex/Half Duplex data translator.

12. The high speed data network of claim 8, further comprising at least one half duplex switch connected to a corresponding said Full Duplex/Half Duplex data translator.

13. The high speed data network of claim 8, further comprising at least one switching hub connected to a corresponding said Full Duplex/Half Duplex data translator.

14. A high speed data network comprising:

a full duplex data equipment; and a Full Duplex/Half Duplex data translator, wherein said data translator comprises buffer means for storing frame data corresponding to data from said full duplex medium to half duplex medium, and means for substantially directly conveying frame data corresponding to said half duplex medium data to said full duplex medium; and a high speed full duplex medium connecting said full duplex data equipment and said Full Duplex/Half Duplex data translator.

15. The high speed data network of claim 14, wherein said Full Duplex/Half Duplex data translator is connected to half duplex data equipment comprising one of a half duplex repeater and a half duplex hub.

16. The high speed data network of claim 14, wherein said high speed full duplex medium comprises optical fiber cable, and said full duplex data equipment comprises one of a full duplex switch and a half duplex switch.

17. The high speed data network of claim 16, wherein said high speed data network further including a twisted pair/fibre optic translator connected between said high speed full duplex medium and said switch.

* * * * *